United States Patent [19]

Hamrick

[11] Patent Number: 4,596,381

[45] Date of Patent: Jun. 24, 1986

[54] APPARATUS AND METHOD FOR INSTALLING LINE IN CONDUIT

[75] Inventor: James C. Hamrick, Kings Mountain, N.C.

[73] Assignee: Thomas Industries, Inc., Matthews, N.C.

[21] Appl. No.: 150,969

[22] Filed: May 19, 1980

[51] Int. Cl.⁴ .............................................. A61M 25/00
[52] U.S. Cl. ................................................ 254/134.4
[58] Field of Search ..................... 254/134.4, 134.3 R; 15/104.06 R, 104.3 SN, 104.3 G, 104.3 R

[56] References Cited

U.S. PATENT DOCUMENTS

| | | | |
|---|---|---|---|
| 1,033,587 | 7/1912 | Hodgman. | |
| 1,848,269 | 3/1932 | Petersen | 15/104.3 R |
| 2,794,197 | 6/1957 | Crane | 15/104.06 R |
| 3,056,156 | 10/1962 | Immel | 15/104.06 R |
| 4,202,531 | 5/1980 | Hamrick | 254/134.4 |

Primary Examiner—Robert C. Watson

Attorney, Agent, or Firm—Emrich & Dithmar

[57] ABSTRACT

Pull lines are utilized for installing electric wires in electrical conduit between junction boxes by attaching a pull line to the near end of a hollow-core line carrier having its forward end closed by a collapsible bag-like member of highly flexible plastic film or fabric. The bag-like member has a cross-section greater than that of the conduit and is inflatable through the trailing end of the line carrier so to maintain a yieldable continuous contact with the conduit interior wall about the line carrier as the carrier is moved through the conduit in response to a pressure differential created at one end of the conduit. In one form, the line carrier is a tubular sleeve of rigid or shape retaining material to which the pull line to be installed is attached; and, in a second form, it is a roll of the line itself which is disposed within the open end of the bag-like member. In a modification of the first form, the bag-like member is collapsed for storage within the sleeve.

31 Claims, 12 Drawing Figures

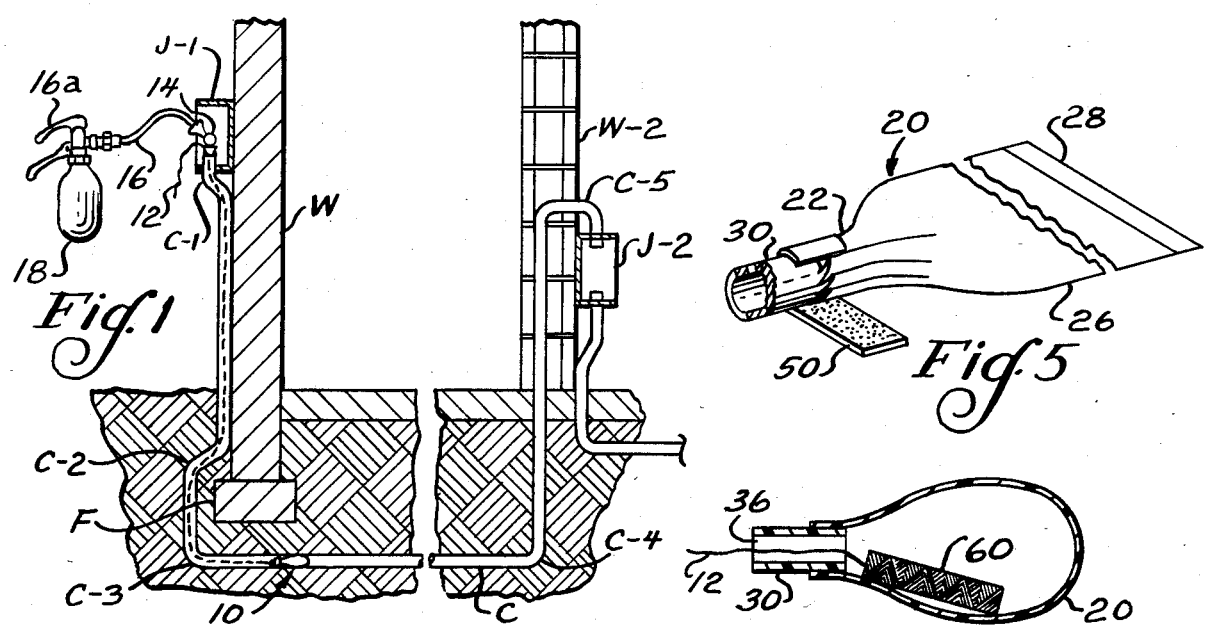
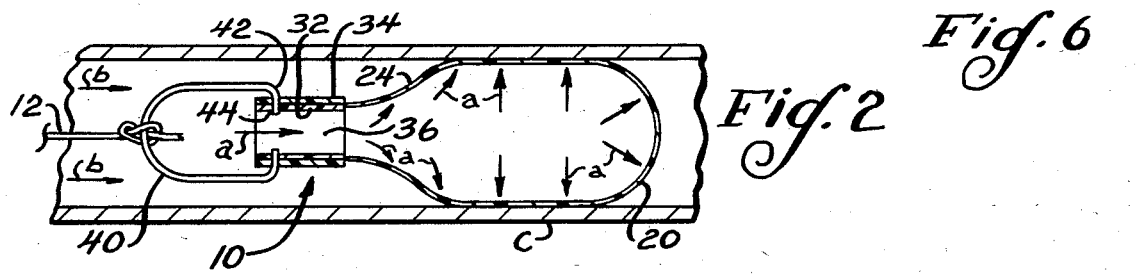
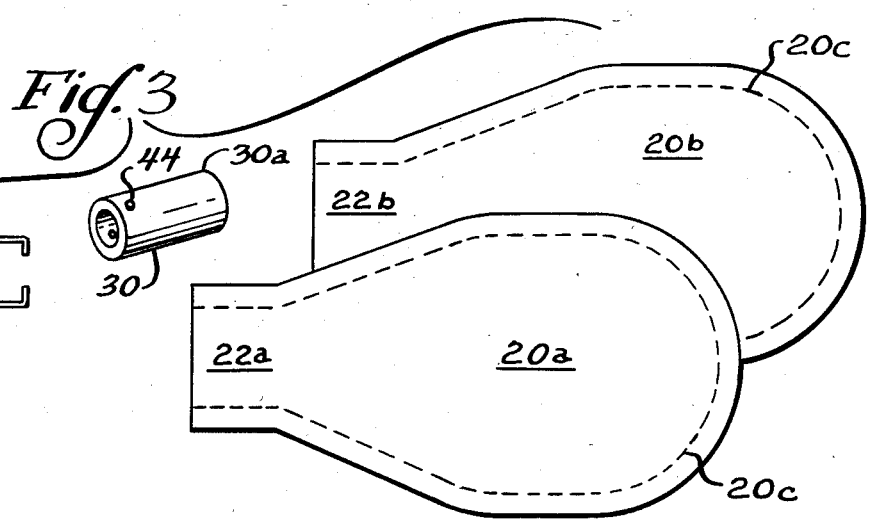
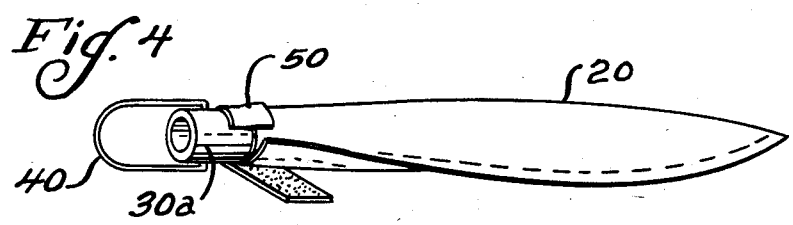

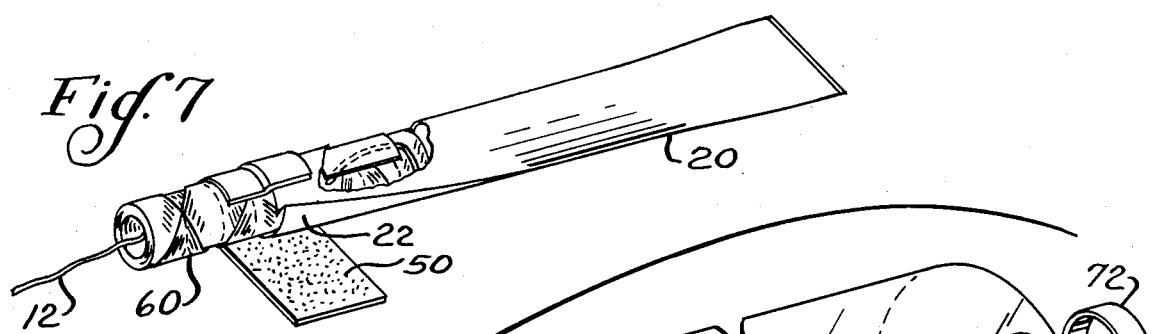
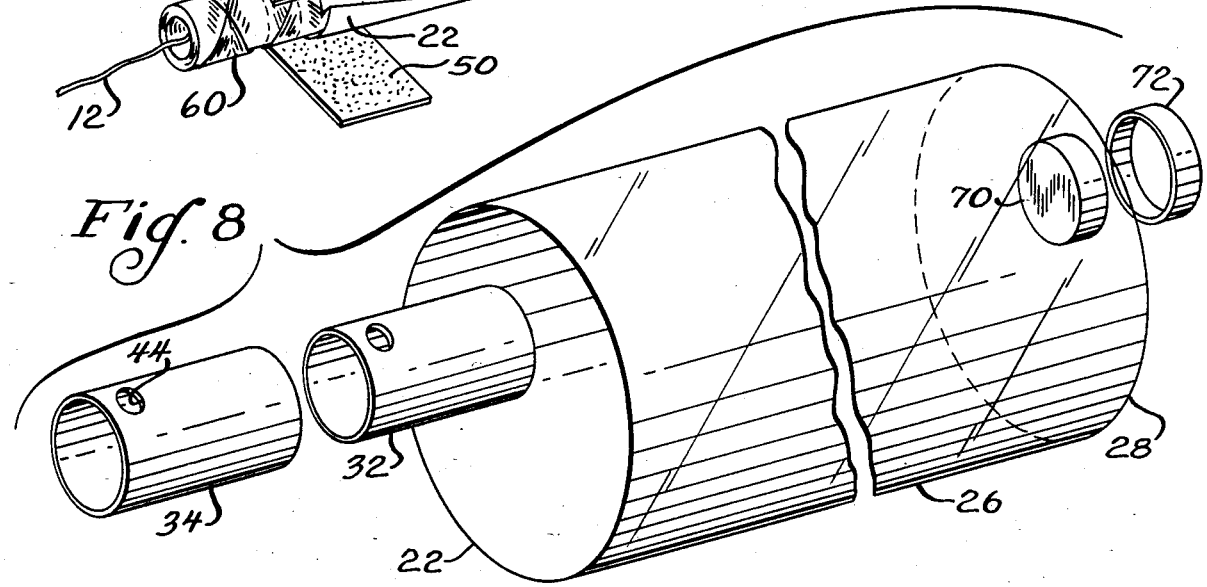
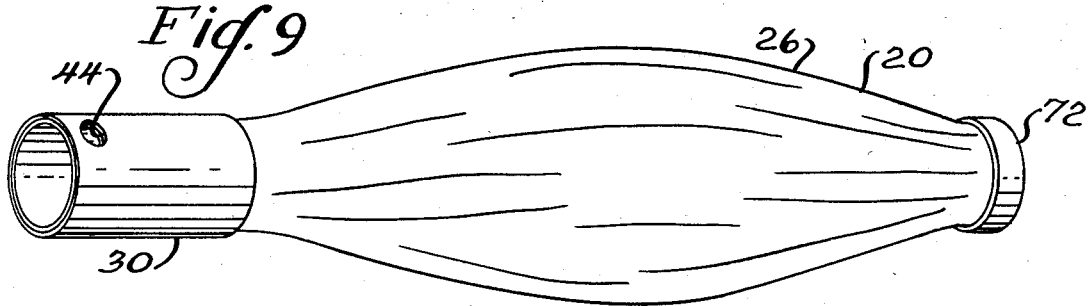
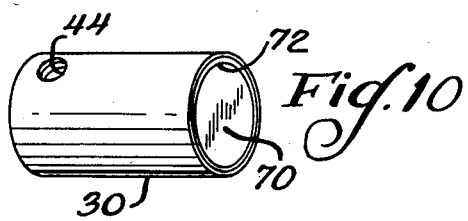
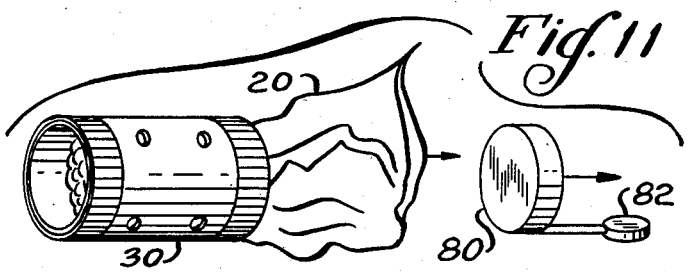
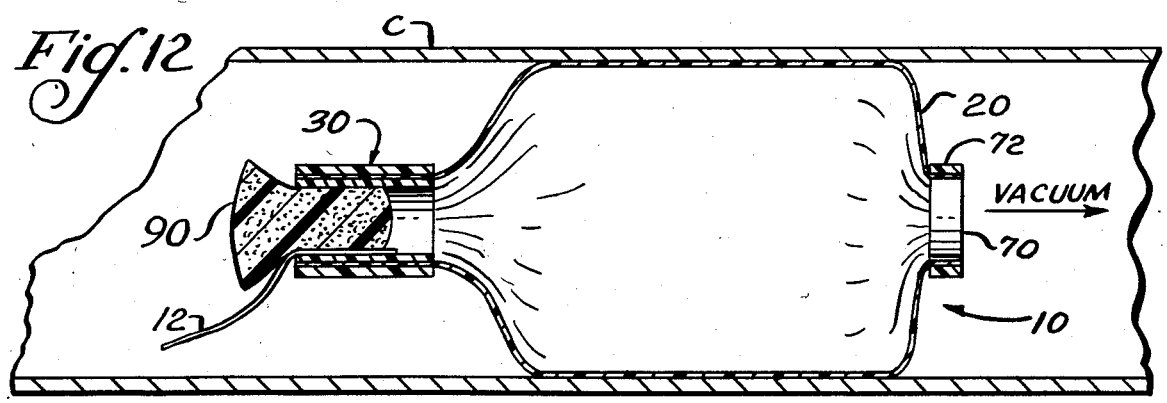

APPARATUS AND METHOD FOR INSTALLING LINE IN CONDUIT

This invention relates to apparatus and method of installing utility lines such as telephone or electrical wiring in provided conduit.

Conventionally, installation of such wiring involves initial placement of junction boxes at desired locations in the floor, ceiling and/or walls of a building under construction and interconnecting the junction boxes by conduits which vary in length and usually have one or more bends, the sharpness of the bend or bends varying with circumstances. The conduits are most conveniently installed within the floor before the cement is laid and/or in the walls and ceiling after the frame is in place but before the walls or ceiling are sheathed in. Thereafter, when construction of the building is further along, appropriate lengths of wire are introduced through the conduit between paired junction boxes and the ends of the wires are electrically connected in required manner.

Depending on the gauge and composition of the wires, as well as the length of the conduits and the number and sharpness of the bends in the conduit, feed of the wires through the conduits can be a difficult and trying chore. These difficulties have spurred much activity in terms of time and effort in an attempt to devise a suitable system or apparatus for "fishing" conduit which would be effective and also inexpensive and simple enough to be conducted by unskilled labor working under the direction of a professional electrician.

One approach has involved the use of a "fish tape" which consists of a thin, highly flexible metal strap or tape that can be inserted into one end of the conduit and pushed therethrough and out the other end of the conduit. The wire is then connected to the fish tape at one end of the conduit and the fish tape drawn through the other end of the conduit to introduce the wire therethrough. Such a system works fairly well where the length of conduit between the junction boxes is short, and the bends in the conduit are kept shallow and few in number. However, this is not always practicable.

Another approach in common use involves introducing a light weight rope, cord or thread into the conduit by attaching it to a projectile or missile which is then inserted into one end of the conduit and driven therethrough by air or other fluid admitted under pressure into the conduit behind the projectile. Alternatively, a partial vacuum can be created in the conduit ahead of the projectile, causing the projectile to move toward said end. In each instance, the cord is drawn with the projectile or missile through the conduit, the cord then being useful as a pull line to introduce the wire. Alternatively, a reel or roll of the line has been mounted on the projectile with one end fixed outside the conduit so that the line pays out into the conduit as the missile or projectile is driven therethrough.

Such projectiles or missiles have taken several forms. For example, it was early proposed that the missile be light in weight and fit loosely within the conduit so that it would not catch as it is driven through the conduit. Such a projectile was usually given the shape of a cone, a cup or a thimble and arranged so as to present a flared wide area surface to increase its response to the force of the pressurized fluid directed thereagainst. However, as the projectile moved away from the source of pressurized air, the inefficiency of the system became more pronounced, and the missile would decelerate and often come to a halt short of the conduit end. The employment of such a loosely fitting missile was particularly unsatisfactory where it was proposed to move the projectile in response to creation of a vacuum in the conduit ahead of the missile.

It also has been proposed to utilize a projectile comprising a sphere or cylinder of a soft sponge rubber or foam plastic which would be large enough in cross-section to resiliently engage the interior wall of the conduit. However, the frictional resistance created by these carriers increased the pressure requirements and in particular, there was the problem of maneuvering the projectile past foreign matter such as dirt in the conduits or dents in the conduit walls, and there was also the problem of maneuvering the projectile around sharp bends in the conduit. Often, the seal with the conduit interior surface would be interrupted or the missile would become wedged in the bend with accompanying deceleration and stoppage of the projectile. It has also been proposed to utilize a cylindrically-wound package of the line itself which would grow smaller and become lighter in weight as it was propelled through the conduit.

Although each of the projectiles thus described worked satisfactorily under controlled circumstances, each presented its own special problems. In many instances, a dented conduit wall or obstruction in the conduit would prevent use of conventional procedures for introducing a pull line through the conduit, and the presence of a sharp angular bend would cause a line-carrying projectile to become wedged in the conduit whereupon measures had to be taken to extricate the projectile from the conduit, with accompanying delay.

A principal object of this invention, therefore, was to provide novel means and improved method for introducing a pull line through a conduit by attaching it to a projectile which is capable of quickly changing shape as it meets an obstruction or bend in the conduit while continuing to maintain a seal with the conduit interior wall and while minimizing frictional resistance to its movement through conduit so that the projectile could proceed quickly and with little pressure loss.

In accordance with this invention, the pull line is connected to a projectile which comprises an inflatable bag-like member of highly flexible, imperforate and air tight, non-elastic plastic or plastic-coated fabric. Such a member normally exists in a collapsed state but on inflation is capable of expanding to a cross-section greater than that of the conduit into which the line is to be installed. A feature thereof is that the mouth of the bag-like member is fixed to a tubular sleeve holder cr line carrier having an axially-through bore by which the bag-like member is inflated to the cross-section of the conduit.

In one embodiment of the invention, the sleeve or holder is adapted for attaching a pull line thereto, whereas in a second embodiment, it comprises a cylindrically-wound roll of the line itself which is fixed within the mouth of the bag-like member. The roll of line can also be loosely mounted within the inflatable bag-like member. In this event, the bore through the tubular sleeve or holder is advantageously of substantially smaller cross-section than the roll of the line.

In use, the projectile is inserted into one end of the conduit with the tubular sleeve or holder facing the supply source of pressurized fluid and the pull line attached thereto (or paying outwardly therefrom) such that the force of the compressed air or other fluid loads the bag-like member through the bore of the holder or sleeve and, as the bag-like member inflates, it also presents an external surface about the sleeve against which the force of the pressurized fluid is simultaneously exerted which drives the bag-like member and its attached holder through the conduit.

A feature of the invention is that the pressure exerted against the interior of the inflated bag balances the driving force exerted on its trailing side so that the bag-like member does not burst but maintains a yielding but continuous sealing engagement with the conduit interior wall. Therefor, as it encounters an obstruction within the conduit or moves through a bend of the conduit, it does not lose its contact or seal with the conduit interior wall and the projectile continues to move through the conduit to its opposite end.

Another feature of the invention is that the projectile can be inserted into the conduit while in a collapsed state and in use inflates up to a maximum cross-section wherefor the line carrier has utility through a wide range of conduit sizes.

An important feature of the invention is that when inflated, the bag-like inflatable member is not stretched but expands to less than its full cross-section and assumes the shape of the conduit interior wall against which it engages so that as the projectile is driven under the force of the admitted pressurized fluid, it does not lose its continuous sealing contact with the conduit interior wall and continues to conform to the shape thereof as it meets obstructions and maneuvers bends in the conduit.

A companion feature of the invention is that the tubular sleeve or holder to which the line is attached maintains the interior of the bag-like member in continuous communication with the supply of compressed air and because the pressure within the bag-like member equals the driving force applied against the trailing side of the bag-like member, its frictional resistance to the driving force is minimal.

Another feature of the invention is that the tubular sleeve or line carrier maintains access Of the bag-like member to the source of pressurized fluid so that it is continuously loaded by the same force driving the missile through the conduit.

Another feature of the invention is that the line carrier is so designed that the bag-like member can be inflated with lung pressure through the tubular sleeve or holder and sealed by inserting a flexible foam plug therein so that the carrier can be drawn to the remote end of the conduit in response to a partial evacuation created ahead of the line carrier.

Another feature of the invention is the role of the line carrier in resisting inversion of the inflatable member as it responds to the force exerted thereon by the created pressure differential which is utilized to move the assembly through a conduit.

In an alternate form of the invention, the bore through the sleeve is utilized as a storage container into which the inflatable bag-like member is collapsed.

Other objects, advantages and features of the invention will be apparent or will become so upon consideration of the preferred forms of the invention which now will be described in connection with the accompanying drawings.

REFERRING NOW TO SAID DRAWINGS

FIG. 1 is a schematic view showing a portion of a building under construction and illustrates the invention being utilized to install a pull line through a length of conduit interconnecting a pair of junction boxes;

FIG. 2 illustrates one form the invention may take, the same being shown on a larger scale;

FIG. 3 illustrates the components comprising the inflatable member of a second form of the invention;

FIG. 4 illustrates the components of FIG. 3 in a partially-assembled relation;

FIG. 5 illustrates a modified form of the embodiment illustrated by FIGS. 2-4;

FIG. 6 illustrates a further embodiment of the invention wherein the pull line comprises a roll of wound line located within the inflatable bag-like member, one end of the line extending through the bore of the connecting sleeve for attachment to the entrant end of the conduit;

FIG. 7 illustrates a third embodiment of the invention wherein the tubular sleeve or holder is replaced by a hollow core roll of the pull line about which the inflatable bag-like member is attached;

FIG. 8 illustrates still another form of the invention wherein the inflatable bag-like member is shown as comprising a section of tubular stock, the cross-section of which is greater than the sleeve portion to which the pull line attaches, the opposite end of the tubular stock being wedged between an enclosing annular ring and plug;

FIG. 9 through 11 show still another embodiment of the invention wherein the sleeve or line carrier is used for storing the inflatable member when the projectile is not in use;

FIG. 10 shows the inflatable member in a collapsed state and being stuffed into the sleeve;

FIG. 11 illustrates the inflatable member stuffed within the sleeve and closed by a plug; and FIG. 12 illustrates how a line carrier in accordance with the invention may be utilized where the driving force is provided by evacuating air from the exit end of the conduit.

Referring now more particularly to the several views of the drawing wherein like parts are identified by like reference numerals, FIGS. 1 and 2 illustrate at 10 a projectile or missile in accordance with the invention to which is connected a pull line 12. The projectile is adapted to be blown through a conduit C which interconnects junction box J-1 and J-2. As shown in FIG. 1, the entrant end C-1 of the conduit connects to the underside of junction box J-1 and is sharply inclined inwardly immediately therebelow to the outer wall W of the building which it follows downwardly to below grade level. There, it is bent first outwardly and then downwardly and inwardly to miss footing F, said bends being illustrated at C-2 and C-3. At C-4, the conduit C again turns at right angles and upwardly into and through wall W-2 to a height of junction box J-2 where its other end C-5 is reverse-bent through 180° and fixed into the top side of said junction box J-2.

A projectile 10 in accordance with the invention as illustrated in FIG. 2, comprises an inflatable bag-like member 20 of a suitable plastic such as polyethylene or a coated fabric such as nylon. The open end or mouth 22 of the bag-like member is shown wedged between inner and outer sleeves 32, 34 of a holder or line carrier 30 to which pull line 12 is attached. In FIG. 1, pull line 12 is shown tied to a bail 40 whose inturned ends 42 rotatably engage in aligned provided openings 44 of sleeves 32, 34. However, any other suitable means may be utilized for connecting pull line 12 to the line carrier 30. For example, the pull line may be inserted through the aligned openings 44 of sleeves 32, 34 and tied thereto. In this event, the bail 40 would be dispensed with. One of sleeves 32, 34 may be made longer than the other and only the longer of the two sleeves provided with opening 44 to which the pull line 12 is then tied. The line carrier or holder 30 may also comprise a single tubular sleeve to which the inflatable bag-like member 20 and pull line is connected.

In accordance with the invention, the inflatable bag-like member 20 preferably has an axial dimension which is several times that of its cross-section and its cross-section exceeds that of the conduit in which it is to be utilized. The line carrier or holder 30 with which it is assembled, however, has an external cross-section substantially less than the interior diameter of the conduit. In FIG. 2, the mouth portion 22 of the bag-like member 20 is shown fitted about the leading end of FIG. 2. For this purpose, the bag-like member may be of heat shrinkable material which has been extended into the illustrated bag shape as is well know. The open end or mouth of the member 22 may then be heat shrunk about the leading end of the inner sleeve 32 so that it snugly fits therewith in an air-tight sealed relation. However, its mouth portion could be folded thereabout and wedged between the telescoped inner and outer sleeves 32, 34. The inflatable bag-like member 20 is thin-walled, and sufficiently highly flexible that it normally exists in a collapsed state. The material of which member 20 is formed is also imperforate, impervious to air and non-elastic in character wherefor the bag-like member 20 is capable of expanding to its full dimensions and shape when inflated but does not stretch. On the other hand, the holder 30 may be constructed of any suitably rigid or shape-retaining material. Advantageously, it may be comprised of a flexible material such as a section of rubber or plastic hosing which allows it sufficiently flexibility to bend but without closing its bore 36.

In use, the pull line 12 is first conveniently attached to the rearward end of the line carrier 30 and the assembly is then inserted into the entrant end C-1 of the conduit C with the collapsed bag-like member 20 facing the remote or exit end C-5 of the conduit C. The entrant end of the conduit C is then plugged by means of a seal-off 14 through which the pull line 12 freely passes, as is conventional; and the seal-off 14 is connected via tube 16 to a supply 18 of fluid under pressure such as compressed air or $CO_2$. At 16a is a manually-operated valve which opens line 16 to pressurize the entrant end C-1 of the conduit C, also as is conventional.

However, unlike in earlier systems, as is illustrated by arrows a and b, a portion a of the compressed air or other fluid entering the conduit behind the projectile 10 loads the inflatable member 20 through the bore 36 of the holder or line carrier 30 causing the bag-like member 20 to inflate until it conforms to and assumes the shape of the interior wall of the conduit C. A second portion of said compressed fluid represented at b is simultaneously directed about the sleeve or line carrier 30 and against the external surface or trailing wall 24 of the inflating bag-like member 20.

It, therefore, should be understood that the bag-like member is fully inflated by the entering compressed air within the limitations imposed by the shape of the interior of the conduit which, in all instances, is less than the full cross-section shape to which the inflatable bag-like member has capacity. With the admission of pressurized air into the entrant end of the conduit, the bag-like member 20 conforms to and assumes the shape of the conduit interior, sealing therewith while presenting its trailing wall portion 24 to portion b of said compressed fluid. In the event the inflatable bag-like member 20 meets an obstruction such as a dent in the conduit wall, a collection of dirt or other obstruction, it yields and reaches over the obstruction but does not interrupt its seal with the conduit interior wall which now includes the obstruction. Because the pressure developed within the interior of the bag-like member 20 equals the driving pressure exerted against its trailing surface, the frictional resistance of the bag-like member remains essentially constant. There is little drag of the bag-like member on the conduit against which it sealingly engages and the line carrier is driven rapidly through the conduit C. Similarly, as the bag-like member approaches a bend in the conduit as illustrated at C-1, C-2 and C-3, as well as at C-4 and C-5, the bag-like member maintains a continuous seal with the interior wall of the conduit; and, in yielding to the changing direction of the conduit, it simply accommodates itself so that there is no interruption of the driving force exerted by the admitted air or other fluid under pressure. Because the bag-like member 20, therefore, maintains a continuous sealing engagement with a minimal frictional resistance or drag, the force of the admitted air or other fluid under pressure is maximized to quickly and effectively drive the line carrier through the full length of the conduit.

In the form of the invention illustrated by FIG. 2, the bag-like member 20 has been considered to have been formed to the illustrated bag-like shape through a combined blowing and extruding process as is conventional. FIG. 3 illustrates another form of the invention wherein the bag-like member 20 comprises two elements 20a and 20b which are cut from sheet stock. Each said element has an enlarged area which terminates in a reduced neck or mouth of smaller cross-section as illustrated at 22a and 22b. As indicated by the dash lines 20c, said pieces 20a and 20b are first aligned and their peripheral edges then united in conventional manner to form a bag as by heat sealing and/or use of a suitable adhesive. In FIG. 3, the line carrier 30 comprises a single sleeve 30a which is inserted into the mouth of the thus-created bag-like member and the portions thereof folded thereabout as illustrated in FIG. 4. The inserted end of the sleeve 30 is then fixed thereto by means of an adhesive-coated tape 50 which is wrapped tightly about the folded mouth portion and the adjacent surface of sleeve 30a. Advantageously, the exterior surface of the sleeve 30 may be pre-coated with a pressure-sensitive adhesive so that in the completed assembly, the sleeve 30 is securely fixed in air tight relation within and to the mouth of the bag-like member.

In FIG. 5, the bag-like member is illustrated as comprising a section of tubing 26, the leading end 28 of which is shown closed as by heat sealing or application of a thickness of adhesive therebetween. The trailing end 22 of the tubular member, as in the embodiment of FIGS. 3-4, which comprises the mouth portion thereof, is snugly folded about the sleeve 30 and secured thereto by a similar piece of adhesive-coated tape 50 which is wrapped tightly thereabout.

FIG. 6 illustrates a second embodiment of the invention wherein a roll 60 of light-weight cord or thread has been pressed through the bore 36 of the sleeve or holder 30 to which the bag-like member has been fixed. As illustrated in FIG. 6, the cross-section of the bore 36 of the holder 30 is less than the cross-section of the roll of 60 of cord or thread so that the roll 60, when located within the bag-like member is retained therein.

In FIG. 7 is shown still another embodiment of the invention wherein the roll of thread or cord 60 is illustrated as fixed in the place of the previously-described sleeve or sleeves comprising the holder 30.

In FIG. 7, the bag-like member 20 is illustrated as having its mouth end folded about the inserted end of the thread roll 60 and is adhesively secured thereto as by tape 50 which is tightly drawn thereabout.

As illustrated in FIG. 7, the roll of thread or cord 60 is so wound so as to leave a through bore and out which the line pays. Thus, the roll of cord sealed in the mouth of the bag-like member has the same utility as the aforementioned forms of a holder 30. Furthermore, it is capable of staying with the bag-like member and represents an effective tool for introducing a pull line into the conduit C.

FIG. 8 and 9 illustrates still another embodiment of the invention wherein the bag-like member comprises an oversized section of tubular stock, one end of which is connected to the inner sleeve 32 of the holder 30 as first described and is wedged therebetween and an outer sleeve 34 which is telescoped thereover. The opposite or leading end 28 of the tubular sleeve 26 which faces the remote or exit end of the conduit is shown closed by folding said end portion about a plug 70 and forcing an annular ring 72 thereover.

FIG. 9 illustrates the bag-like member 20 fixed to its holder 30 with its opposite end wedged between plug 70 and annular ring 72. In this embodiment, its sleeve 30 has been provided with a bore that is large enough that the bag-like member 20 may be stuffed into its leading end which is then closed by forcing plug 70 and ring 72 into said leading end of the sleeve 30. Thus, the sleeve 30 provides a convenient container in which the collapsed bag-like member 20 can be stored when not in use. (FIG. 10)

FIG. 11 illustrates an alternative use of the embodiment of FIGS. 8, 9 and 10 wherein the leading end of the bag-like member has been closed in the manner, for example, illustrated by FIG. 5. When fully stuffed within the sleeve 30, it is closed by a separate plug 80 which is illustrated as provided with a pull handle 82.

Referring next to FIG. 12, it will be understood that a missile or projectile in accordance with the invention, also has utility when it is more convenient to drive the projectile with the pull line attached thereto in response to creation of a partial vacuum ahead of the projectile and at the remote or exit end of the conduit C-5. Thus, in FIG. 12, the projectile 10 is illustrated as of the construction represented by FIGS. 8 and 9. However, it should be understood that it may assume any of the other illustrated forms as for example, those of FIGS. 2, 3-4, and 5.

As illustrated in FIG. 12, for this purpose, the bag-like member 20 is inflated through the bore of the sleeve 30 utilizing lung pressure. The bore is then sealed by inserting a soft foamed plastic plug 90 into the near end of the bore 36 in holder 30. As illustrated in FIG. 12, said plug may be utilized not only to seal the inflated bag-like member but may also be used to fix the pull line 12 to sleeve 30 of the inflated assembly. When thus inflated, the assembly can be inserted into the entrant end C-1 of the conduit as before, and the assembly including the connected pull line 12 drawn through the conduit to the remote end C-5 of the conduit in response to a partial vacuum created at said exit end.

From the aforesaid description of preferred forms and embodiments of the invention, it will be recognized that all of the recited objects, advantages and features of the invention have been demonstrated as obtainable in a highly-practical structure.

Thus, having described my invention, I claim:

1. Apparatus for moving line through a conduit in response to a pressure differential created at one end of the conduit, said apparatus comprising, in combination,
    a line carrier having an open-ended through-bore extending lengthwise thereof, said carrier having an outside diameter less than the inner diameter of the conduit; and
    an inflatable bag-like member of flexible imperforate material having an outside diameter when fully inflated greater than the inside diameter of the conduit;
    said inflatable bag-like member having an open-ended portion fixed to the forward open end of the line carrier such that the bag-like member is inflated by the admission of fluid under pressure through the trailing open end of the line carrier whereby to yieldingly engage the inside of the conduit when located therein;
    the line carrier comprising an elongate generally cylindrical roll of line within the inflatable bag-like member which pays out through the open end of the inflatable bag-like member.

2. Apparatus according to claim 1 wherein the line is so wound in said roll that it may be unwound from the inside of the roll through the trailing end of the roll.

3. Apparatus for moving line through a conduit in response to a pressure differential created at one end of the conduit, said apparatus comprising, in combination,
    a line carrier having an open-ended through-bore extending lengthwise thereof, said carrier having an outside diameter less than the inner diameter of the conduit; and
    an inflatable bag-like member of flexible, imperforate material having an outside diameter when fully inflated greater than the inside diameter of the conduit;
    said inflatable bag-like member having an open-ended portion fixed to the forward open end of the line carrier such that the bag-like member is inflatable by the admission of fluid under pressure through the trailing open end of the line carrier whereby to yieldingly engage the inside of the conduit when located therein; and
    the line carrier comprising a pair of telescoped sleeves between which the open-end portion of the inflatable member is fixed, one of said sleeves having connection means to which a pull line is connectable.

4. Apparatus according to claim 3 wherein said connection means comprises a bail attached to the trailing end of the one of said sleeves.

5. Apparatus according to claim 3 wherein said connection means comprises an opening in the wall of at least one of the said sleeves.

6. Apparatus for moving line through a conduit in response to a pressure differential created by admitting fluid into one end of the conduit, said apparatus comprising, in combination, a rigid open-ended tubular-shaped line carrier having an outside diameter less than the inner diameter of the conduit, said line carrier having a forward open end and a rearward open end;

an inflatable bag-like member of highly flexible, imperforate non-elastic material that normally exsists in an inwardly collapsed state, is capable of inflation without stretching and has an outside diameter greater than the inside diameter of the conduit, said inflatable bag-like member which is otherwise closed having an open end portion fixed about the forward open end of the line carrier such that when the inflatable member is inserted into the conduit and fluid is forced into said conduit, said rigid line carrier is disposed axially of said conduit and adapted to communicate said fluid to the interior of said member to inflate same, and said member is inflated to a diameter less than its full cross section thereby causing said highly flexible material to engage continuously the interior surface of said conduit for a substantial portion of its axial length to form a seal therewith, and the interior of said bag-like member being maintained in communication with the conduit through said line carrier insuring that the bag-like member is inflated and maintained inflated with fluid under pressure through the trailing open end of the line carrier, as it presents a trailing portion of its external surface to the driving force of said fluid admitted into the conduit whereby to yield as it encounters an obstruction while continuing to maintain an uninterrupted sealing engagement with the inside of the conduit as it is propelled therethrough under the pressure of the admitted fluid; and means on said trailing end of the tubular-shaped line carrier by which a pull line is connectable thereto.

7. Apparatus according to claim 6 wherein the open-end portion of the bag-like member is adhesively secured to and about the forward end of the tubular-shaped line carrier.

8. Apparatus for moving line through a conduit in response to a pressure differential created by admitting fluid into one end of the conduit, said apparatus comprising, in combination, an open-ended tubular-shaped line carrier having outside diameter less than the inner diameter of the conduit;

an inwardly collapsed bag-like member of flexible, imperforate non-elastic material capable of opening to an outside diameter greater than the inside diameter of the conduit;

said bag-like member having an open end portion fixed about the forward open end of the line carrier but is otherwise closed such that the bag-like member loads with fluid under pressure through the trailing open end of the line carrier as it presents its external surface to the driving force of said fluid to yieldingly conform and seal to the inside of the conduit to avoid pressure loss around the bag-like member as it is propelled therethrough under the pressure of the admitted fluid, and means on said trailing end of the tubular-shaped line carrier by which a pull line is connectable thereto;

the open-ended portion of the bag-like member fixed to the line carrier being collapsed about the line carrier, and tape means wound about said collapsed end portion.

9. Apparatus according to claim 8 wherein the bag-like member is comprised of tubular stock having an inside diameter greater than the outside diameter of the tubular-shaped line carrier.

10. Apparatus according to claim 9 having means closing the end of the bag-like member remote from the tubular-shaped line carrier.

11. Apparatus according to claim 10 wherein said means closing the end of the bag-like member comprises an outer ring and an inner plug between the circumferential walls of which the remote end of the tubular stock comprising the bag-like member is wedged.

12. Apparatus according to claim 10 wherein the means closing the remote end of the bag-like member comprises a thickness of adhesive material.

13. Apparatus according to claim 10 wherein the remote end of the bag-like member is closed by a heat fused connection.

14. Apparatus for installing a pull line through a conduit in response to an increase in pressure created at one end of the conduit, said apparatus comprising, in combination, an open-ended tubular sleeve of shape-retaining material having an external cross section less than that of the conduit, a bag-like member of flexible imperforate non-elastic material having an open-end portion collapsed about the forward end of said tubular sleeve, a tape member wound about said collapsed open-end portion securing it to the tubular sleeve, and connector means on the trailing end of the tubular sleeve by which a pull line to be drawn through the conduit is connectable, said bag-like member being inflatable through the trailing end of said tubular sleeve when inserted into said one end of the conduit with the trailing end of the sleeve directed toward said conduit end, and said bag-like member being otherwise closed and having a circumferential dimension across the axis of the sleeve greater than that of the conduit interior such that it is capable of maintaining yielding but continuous circumferential sealing contact with the conduit interior wall to avoid pressure loss about the bag-like member as the external surface of the bag-like member is presented to the driving force of the increase in pressure at said one end of the conduit.

15. Apparatus for installing a pull line through a conduit in response to an increase in pressure created at one end of the conduit, said apparatus comprising, in combination, a generally elongate roll of line so wound as to define an open-ended hollow core from which trails one end of the line, retaining means for maintaining the hollow core shape of the roll as it is unwound, a bag-like member of flexible imperforate material having an open-end portion collapsed over at least the forward end of said roll of line, means fixing said collapsed end portion of the bag-like member to the said roll of line, said bag-like member being inflatable through the hollow core of said cylindrical roll of line when inserted into said one end of the conduit with the trailing end of the line directed toward said conduit end, and said bag-like member having a circumferential dimension greater than that of the conduit interior such that when inflated, it is capable of maintaining yielding but continuous circumferential sealing contact with the conduit interior as it is moved toward the other conduit end.

16. Apparatus according to claim 15 wherein the means fixing the collapsed end portion of the bag-like member to the roll of line comprises a tape-like member tightly wound about the roll and adhesively joined to the roll and to the collapsed end portion of the bag-like member.

17. Apparatus according to claim 15 wherein the open end portion of the bag-like member is heat-shrunk about the elongate roll of line.

18. Apparatus for installing a pull line through a conduit in response to an increase in pressure created at one end of the conduit, said apparatus comprising, in combination,
   an open-ended tubular line carrier of shape-retaining material having a cross section less than that of the conduit,
   a bag-like member of flexible imperforate non-elastic tubular material having an outside diameter greater than that of the tubular line carrier,
   one end portion of said tubular bag-like member protruding into the forward end of the line carrier and attached thereto,
   the opposite end of said tubular bag-like member being closed by a circular-shaped plug affixed thereto,
   said tubular bag-like member being collapsible into said forward end of the line carrier for storage, and the plug being so dimensioned as to close said forward end of the tubular line carrier when the tubular bag-like member is collapsed therein for storage,
   said bag-like member being inflatable through the trailing end of said tubular line carrier, and
   said bag-like member having a circumferential dimension across the axis of the line carrier greater than that of the conduit interior such that, when inflated, it is capable of maintaining yielding but continuous circumferential sealing contact with the conduit interior as it is moved toward the other conduit end.

19. Apparatus as claimed in claim 18 wherein the tubular line carrier comprises inner and outer sleeves in telescoped relation having the collapsed end portion of the tubular bag-like member held therebetween.

20. Apparatus as claimed in claim 18 wherein the plug closure for the opposite end of the tubular bag-like member comprises a cup-like member having a projecting annular wall and a disk-like member between which the opposite end of the tubular bag-like member is fixed.

21. Apparatus for installing a pull line through a conduit in response to an increase in pressure created at one end of the conduit, said apparatus comprising, in combination,
   an open-ended tubular sleeve of shape-retaining material having a cross section less than that of the conduit,
   a bag-like member of flexible imperforate material having an open-end portion secured with the forward end of said tubular sleeve,
   said bag-like member being stuffable into said sleeve through the forward end of the sleeve for storage,
   a disk-like closure plug for said forward end of the sleeve when the bag-like member is stored therein,
   connector means on the trailing end of the sleeve by which a pull line to be drawn through the conduit is connectable,
   said bag-like member being inflatable through the trailing end of said tubular sleeve when inserted into said one end of the conduit with the trailing end of the sleeve directed toward said conduit end, and
   said bag-like member having a circumferential dimension across the axis of the sleeve greater than that of the conduit interior such that, when inflated, it is capable of maintaining yielding but continuous circumferential sealing contact with the conduit interior as it is moved toward the other conduit end.

22. Apparatus for moving line through a conduit in response to a pressure differential created therein, said apparatus comprising, in combination,
   an open-end tubular holder of a diameter less than that of the conduit,
   an inflatable tube of flexible imperforate material having one end closed and an open end fixed to one end of the tubular holder such that pressurized gas may be admitted into the inflatable tube through the holder;
   said inflatable tube being collapsible within the holder through said one end thereof to which it is fixed, and inflatable outside the holder to a diameter greater than that of the conduit,
   the other open end of the tubular holder having means by which a pull line is connectable thereto, and,
   a cap for closing said one end of the holder to enclose the inflatable tube when collapsed into the holder.

23. Apparatus for moving line through a conduit in response to loading of one end of the conduit with fluid under pressure, said apparatus comprising
   a rigid line carrier of shape retention material having an outside diameter less than the inside diameter of the conduit and a through-bore extending lengthwise between a forward open end and a trailing open end thereof;
   a bag-like member of inwardly collapsed flexible imperforate material having an entrant end fixed to the line carrier about said bore so that said line carrier maintains said entrant end open defining an inlet through which fluid is admitted to the interior of the bag-like member;
   said bag-like member being otherwise closed and having an outside perimetric dimension at right angles to the axis of the line carrier which is considerably greater than is the corresponding perimetric dimension of the conduit inside; and
   the material of said bag-like member being highly flexible such that the bag-like member exists in an inwardly collapsed state when not inflated and is capable of expanding outwardly of said collapsed state, such that when said member is inserted into the conduit and fluid is admitted under pressure at said one end of the conduit, said rigid line carrier is disposed axially of the conduit and communicates the fluid to the interior of said bag-like member to inflate same, and said member is inflated to a diameter less than its full cross section causing the highly flexible material to engage continuously the inside surface of the conduit along a substantial portion of its axial length to form a seal therewith, and to present a trailing side of its external surface to the driving force of said admitted fluid whereby the admitted fluid does not flow beyond the bag-like member, but divides its force between the inside and outside surfaces of the bag-like member to avoid interruption or loss of pressure as the line carrier is propelled through the conduit.

24. Apparatus according to claim 23 wherein the line carrier comprises a sleeve having means by which a pull line is connectable thereto.

25. Apparatus according to claim 23 wherein the said line carrier is adapted for attachment to one end of a supply of line located outside the entrant end of the conduit.

26. Apparatus according to claim wherein the line carrier comprises a rolled supply of line having a free end for locating outside the entrant end of the conduit.

27. Apparatus according to claim 23, further comprising a supply of line contained within the inflatable bag-like member and having a free end extending through the bore of said line carrier for location outside the entrant end of the conduit.

28. Apparatus according to claim 23 wherein the inflatable bag-like member has an axial dimension which is several times that of its cross section and its cross section exceeds that of the conduit in which it is to be utilized.

29. A method of installing pull line through an open-ended conduit wherein:

the pull line is attached to the open end of a bag-like member of flexible imperforate material which exists normally in a collapsed uninflated state and has a cross section greater than that of the conduit;

the bag-like member is inserted while in a collapsed state with its open end facing the open end of the conduit through which the pull line is to be installed, and the bag-like member is inflated and is closed after inflation and is maintained in an inflated state sufficient to establish a yielding but continuous uninterrupted sealing contact thereof with the interior wall of the conduit about the axis thereof in response to a pressure differential created in the other end of the conduit to draw the inflated bag-like member and its attached pull line to the other end of the conduit.

30. Method according to claim 29 wherein the pull line is located outside the conduit and one end thereof is attached to the bag-like member and drawn therewith to the other end of the conduit.

31. A method of installing pull line through a conduit containing obstruction in the form of dents, curved sections or soil and the like comprising the steps of attaching the pull line to a bag-like member of highly flexible imperforate material whose lateral perimetric dimension exceeds the greatest perimetric dimension of the conduit, the pull line being attached in roll form within the open mouth of the bag-like member and the trailing end of the pull line being stationarily fixed at one end of the conduit;

inserting the bag-like member while in a collapsed state into one end of the conduit and facing its open mouth toward said conduit end;

admitting fluid to said one end of the conduit under pressure to drive said member to the opposite end of the conduit;

direction a portion of said fluid into the bag-like member through its open mouth to expand the bag-like member to a diameter less than its full cross section thereby causing said highly flexible material to engage continuously the interior surface of the conduit to maintain said bag-like member in a yielding continuous seal with the inside surface of the conduit along a substantial portion of its axial length as the bag-like member is driven to the opposite end of the conduit, whereby the bag-like member maintains a yielding but continuous sealing engagement with the inside surface of the conduit and there is minimal escape of fluid around the bag-like member and the driving pressure is not abated.

* * * * *